United States Patent [19]

Mueller et al.

[11] Patent Number: 5,334,681
[45] Date of Patent: Aug. 2, 1994

[54] FLUORINE AND/OR SILICONE CONTAINING POLY(ALKYLENE-OXIDE)-BLOCK COPOLYMER HYDROGELS AND CONTACT LENSES THEREOF

[75] Inventors: Karl F. Mueller, New York; Walter L. Plankl, Yorktown Heights, both of N.Y.

[73] Assignee: Ciba-Geigy Corporation, New York, N.Y.

[21] Appl. No.: 168,979

[22] Filed: Dec. 17, 1993

Related U.S. Application Data

[63] Continuation of Ser. No. 73,644, Jun. 8, 1993, abandoned, which is a continuation of Ser. No. 931,646, Aug. 17, 1992, abandoned, which is a continuation of Ser. No. 630,711, Dec. 20, 1990, abandoned, which is a continuation-in-part of Ser. No. 486,493, Feb. 28, 1990, Pat. No. 5,115,056, which is a continuation-in-part of Ser. No. 368,755, Jun. 20, 1989, abandoned.

[51] Int. Cl.$^5$ ................... C08F 12/30; C08F 114/18
[52] U.S. Cl. ................... 526/243; 526/245; 526/247; 526/251; 526/279; 525/404; 525/455; 351/160 R; 351/160 H
[58] Field of Search ............ 526/279, 251, 247, 245, 526/243; 525/404, 455; 351/160 R, 160 H

[56] References Cited

U.S. PATENT DOCUMENTS

| | | | |
|---|---|---|---|
| 2,718,516 | 9/1955 | Bortnick | 260/86.1 |
| 3,728,151 | 1/1968 | Sherman et al. | 117/138.8 A |
| 4,046,944 | 9/1977 | Mueller et al. | 428/262 |
| 4,136,250 | 1/1979 | Mueller et al. | 528/29 |
| 4,139,513 | 2/1979 | Tanaka et al. | 260/29.6 TA |
| 4,139,692 | 2/1979 | Tanaka et al. | 526/218 |
| 4,182,822 | 1/1980 | Chang | 526/264 |
| 4,343,927 | 8/1982 | Chang | 526/262 |
| 4,433,111 | 2/1984 | Tighe et al. | 525/326.2 |
| 4,440,918 | 4/1984 | Rice et al. | 526/246 |
| 4,493,910 | 1/1985 | Tighe et al. | 523/108 |
| 4,638,040 | 1/1987 | Hammar | 526/245 |
| 4,640,965 | 2/9187 | Falcetta et al. | 526/242 |
| 4,650,843 | 3/1987 | Yokoyama et al. | 526/245 |
| 4,686,267 | 8/1987 | Ellis et al. | 526/426 |
| 4,711,943 | 12/1987 | Harvey, III | 526/279 |
| 4,740,533 | 4/1988 | Su | 523/106 |
| 4,818,801 | 4/1989 | Rice et al. | 526/246 |
| 4,929,692 | 5/1990 | Goldenberg | 526/245 |
| 4,996,275 | 2/1991 | Ellis et al. | 526/245 |
| 5,002,978 | 3/1991 | Goldenberg | 523/106 |

FOREIGN PATENT DOCUMENTS

| | | |
|---|---|---|
| 0379462 | 7/1990 | European Pat. Off. . |
| 0406161 | 1/1991 | European Pat. Off. . |
| 1252099 | 11/1971 | United Kingdom ....... C07C 119/01 |

*Primary Examiner*—Ralph H. Dean
*Assistant Examiner*—Karen A. Dean
*Attorney, Agent, or Firm*—Edward McC. Roberts; Robert Scott Meece

[57] ABSTRACT

Fluorine and/or silicone containing block copolymers are described which are the copolymerization product of mono; di- or trivinyl substituted poly(ethylene oxide) prepolymers (A) and fluoroalkyl-alkylene acrylates or methacrylates (B1), oligosiloxy-silyl alkyl-acrylates or methacrylates (B2), ether copolymerizable comonomers (C), and 0.1 to 10% of a di- or polyvinyl crosslinking comonomer (D) of 200 to 1000 molecular weight. The novel block copolymers are prepared in solution or bulk and form hydrogels, which are characterized by high oxygen permeability, resiliency, flexibility and wettability and are therefore well suited as biocompatible polymers, especially as contact lenses.

58 Claims, No Drawings

FLUORINE AND/OR SILICONE CONTAINING POLY(ALKYLENE-OXIDE)-BLOCK COPOLYMER HYDROGELS AND CONTACT LENSES THEREOF

This application is a continuation, of application Ser. No. 08/073,644, filed Jun. 8, 1993; which is a continuation of 07/931,646 filed Aug. 17, 1992, abandoned; which is a continuation of 07/630,711, filed Dec. 20, 1990, abandoned; which is a continuation-in-part of 07/486,493, filed Feb. 28, 1990, U.S. Pat. No. 5,115,056, issued May 19, 1992; which is a continuation-in-part of 07/368,755 filed Jun. 20, 1989, abandoned.

BACKGROUND OF THE INVENTION

Two classes of contact lenses can be distinguished by the way they are fitted to the eye. In hard lenses the fit is flatter than the cornea itself and the lens rocks back and forth with each eye lid blink, pumping tear fluid and thereby oxygen, as well as cell debris under and from under the lens. Hard lenses are preferred whenever excellent visual acuity is desired and difficult vision corrections are required, for instance in the case of astigmatism. They are however less comfortable for the wearer than are soft lenses, the second class of contact lenses. Soft contact lenses derive their name from their low modulus and draping quality, which allows them to smoothly cover the cornea surface. They are fitted to match the cornea as closely as possible and they are not much disturbed by the eyelid. Because of their tight adherence to the cornea, they have to possess sufficient oxygen permeability to keep the cornea well supplied with oxygen.

In the most common soft lens material — 40% water containing poly-(2-hydroxyethyl methacrylate) or poly-HEMA — water provides for sufficient oxygen flux to allow poly-HEMA lenses to be worn on a daily basis. The oxygen permeability $O_2.DK$ of a poly-HEMA hydrogel with 40% water is 6.5 barrers, and for hydrogels with higher water content, for example poly-(N-vinylpyrrolidone) or poly-(vinyl alcohol) copolymers it is 12.5 at 50% water, 15.5 at 60% water and 25 at 70% water. Such higher water content hydrogels allow therefore the manufacture of soft contact lenses for extended wear, up to several months, subject only to periodic cleaning. Unfortunately, high water content hydrogels are also very fragile, especially if they are cut very thin, as they often are in order to increase oxygen flux.

Another class of soft contact lens materials are polysiloxane rubbers (PDMSi), which can have $O_2.DK$ values up to 500 barrers. Several polysiloxane based soft contact lens materials have been described, among them: conventional PDMSi rubbers produced by a hydrosilation cure; PDMSi-polyurethanes and PDMSi-polyacrylate block copolymers. All these materials suffer from an inherent lack of wettability and therefore require some kind of surface treatment to achieve the wettability required for comfortable and safe in-eye wear.

For non-hydrogel, water free contact lens compositions, siloxane units containing polymers have been used both, for soft contact lenses and hard contact lenses with enhanced oxygen permeability; fluorinated groups, which are another group of oxygenflux enhancing moieties, have only been used in hard contact lens materials although they would be preferable to siloxane groups in non-hydrogel soft lenses as well because of their low lipophilicity and low protein adsorption tendencies.

In hydrogel soft contact lens materials on the other hand, siloxane as well as fluorine has been used to enhance the oxygen permeability and many such silicone or fluorine containing hydrogels have been described in the literature for use as contact lens materials. Such silicone and/or fluorine containing hydrogels can possess oxygen permeabilities 3-8 times that of Si-or F-free hydrogels and at the same time retain some of the good wettability of hydrogels. Polysiloxane hydrogels which are water swollen copolymers of 2-hydroxyethyl methacrylate or N-vinylpyrrolidone (NVP) with di- or tri-methacrylate functional poly(dimethylsiloxane) have been described in U.S. Pat. No. 4,136,250 for use as a drug delivery matrix, but also for contact lenses. Copolymers of tri-siloxy-hydroxy alkyl methacrylate with HEMA and/or NVP are described in U.S. Pat. Nos. 4,139,692 and 4,139,513, and copolymers of $C_1$-$C_4$-dialkylacrylamides with oligosiloxanyl-silylalkyl methacrylates are described in U.S. Pat. Nos. 4,182,822 and 4,343,927, also for use as oxygen permeable hydrogel contact lenses. U.S. Pat. No. 4,711,943 describes essentially similar Si-containing acrylic hydrogels.

Fluorinated hydrogels for use as soft contact lens materials are also known: U.S. Pat. Nos. 4,433,111 and 4,493,910 describe hydrogels and contact lenses obtained by copolymerization of 20-40 mol % substituted or unsubstituted acrylamide or methacrylamide; 25-55 mol % N-vinylpyrrolidone (NVP); 5-20% mol % hydroxy-alkyl(meth)-acrylate; 1-10 mol % (meth)-acrylic acid, and 1-9 mol % of a perfluoroalkyl-alkylene(-meth)-acrylate; the perfluoroalkyl groups act to to reduce protein deposition. U.S. Pat. No. 4,640,965 describes hydrogels and contact lenses obtained by copolymerization of hydroxy-fluoralkylstyrene ($5\cong60\%$, by weight), with hydroxyalkyl (meth)-acrylates or N-vinylpyrrolidone (40-95%, by weight); the hydroxy groups is necessary to attain the required compatibility.

U.S. Pat. No. 4,638,040 describes the synthesis of 1,3-bis(trifluoro-acetoxy)propyl-2-methacrylate polymers and their use as hydrogel contact lens materials or as ocular implants after hydrolysis. U.S. Pat. No. 4,650,843 describes hydrogel contact lens materials consisting essentially of copolymers of 50-95% (by weight) of 2-hydroxyethyl-methacrylate and 5-35% (by weight) of fluorinated methacrylates with up to 5 F-atoms.

Copolymers of N,N-dimethylacrylamide (DMA) with perfluoroalkyl acrylates or methacrylates are described in copending patent application Ser. No. 215,101 for use as oxygen permeable hydrogel contact lenses.

In all the cited prior-art is the hydrophilic component based of water-soluble vinyl monomers, like HEMA, NVP or DMA, which are copolymerized with silicone and/or fluorine containing monomers or prepolymers. Although a great variety of Si or F containing hydrogels can be prepared with these hydrophilic monomers, they all possess as hydrophilic component a carbon-carbon backbone polymer; for the specific requirements of long-term in-eye use, contact lenses with poly-(ethylene oxide) (PEO) as hydrophilic component would be preferable since PEO is considered to have better biocompatibility and less lipid and protein adsorption problems. Less protein adsorption generally means less discoloration, better wettability and comfort, and generally a longer use life for a contact lens.

Poly-(ethylene oxide) as part of a silicone containing hydrogel is included also in U.S. Pat. No. 4,136,250, in form of dimethacrylate-(PEO)-(PDMSi)-(PEO) block copolymers, copolymerized with HEMA or NVP; the amount of PEO incorporated into the polymer is limited due to the presence of the other comonomers. Similar poly-(propylene oxide)-PMDSi block copolymers are disclosed in U.S. Pat. No. 4,740,533 although this patent is directed toward essentially water free polymers for contact lenses.

Poly-(ethylene oxide) as part of fluorine containing hydrophilic polymers is also described: U.S. Pat. No. 3,728,151 describes PEO block copolymer with perfluoroalkyl ($-R_f$) acrylates and -methacrylates, obtained by chain transfer polymerization with PEO-dithiols; by virtue of their synthesis method these polymers are linear, non-crosslinked, low molecular weight polymers of the A-B-A block type; their use is in textile finishing, where they import anti-soiling and soil-releasing, self-washing properties. U.S. Pat. No. 4,046,944 describes block copolyurethane-ureas prepared from PEO-diols and PEO-diamines, bis-perfluoroalkyl substituted butane diols and diisocyanates, also for use in textile finishing as soil-release agents. This polymer too is not crosslinked and therefore not a hydrogel, and of limited molecular weight.

No PEO and F-containing hydrogels are described in the prior art for use in biomaterials and contact lenses. This is probably due to the difficulty in making clear compositions of high molecular weight; since the PEO-hydrophile is a pre-polymeric unit of at least 1,000 MW, the F-containing part of the polymer has to be present in a polymeric form as well; block-copolymers of this type are clear only if the blocks are sufficiently short and association between blocks are in size smaller than the wavelength of light. PEO and F-blocks are especially difficult to combine into a clear copolymer because of the inherent incompatibility of their prepolymeric and monomeric precursors and their very different refraction indices.

It has now unexpectedly been discovered that novel, crosslinked, clear, wettable and highly oxygen permeable poly(ethylene oxide) and fluorine or silicone containing block-copolymers can be prepared, if $\alpha,\beta$-divinyl functionalized PEO-prepolymer is copolymerized with perfluoroalkyl acrylates or methacrylates and/or oligosiloxy-silylalkyl acrylates or methacrylates together with a poly-ethylenically unsaturated monomer which acts as a crosslinking monomer for the fluorine or silicone containing phase of the novel polymers. The polymerization is carried out in the presence either of a third comonomer acting as a solvent, or a non-reactive solvent or solvent mixture, capable of dissolving all monomeric components.

After synthesis, the polymers can be transformed by equilibration in water into flexible, clear, wettable and oxygen permeable hydrogels, which are useful in biomedical application, as oxygen permeable films and coatings and especially as deposit resistant, highly oxygen permeable contact lenses.

It has further been discovered, that clear block-copolymers with analogous structures can also be made with poly-propylene oxide and poly-tetramethylene oxide as polyether blocks. These block copolymers are strong, flexible, $O_2$-permeable and, despite a low (< 5%) water content, highly wettable and are therefore useful in many of the above-mentioned applications.

DETAILED DESCRIPTION

The instant invention pertains to copolymers which are oxygen permeable, flexible, wettable, biocompatible and suitable for use in ophthalmic devices, such as contact lenses, which copolymers comprise the polymerization product of (A) 15 to 69.9% by weight of a vinyl-telechelic polyether, or a mixture thereof, (B) 30 to 84.9% by weight of (B-1) a fluorinated, ethylenically unsaturated monomer, or (B-2) a silicone-containing ethylenically unsaturated monomer, or a mixture of monomer (B-1) and monomer (B-2), (C) 0 to 40% by weight of an ethylenically unsaturated monomer or mixture of monomers other than monomer (B-1) or monomer (B-2), and (D) 0.1 to 10% by weight or 0.1 to 10% by weight of a polyethylenically unsaturated comonomer of 200 to 1000 molecular weight or 0.1 to 10% by weight of a of a di-or polyvinyl monomer of 200 to 1000 molecular weight.

Preferred are copolymers wherein component (A) is 25 to 49.5% by weight, (B) is 50 to 84.5% by weight, component (C) is 0 to 20% by weight and component (D) is 0.5 to 7% by weight of said copolymer.

The vinyl-telechelic polyether (A) has the formula:

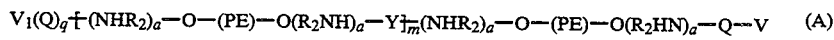

$$V_1(Q)_q\text{-}[(NHR_2)_a\text{-}O\text{-}(PE)\text{-}O(R_2NH)_a\text{-}Y]_m(NHR_2)_a\text{-}O\text{-}(PE)\text{-}O(R_2HN)_a\text{-}Q\text{-}V \quad (A)$$

wherein PE has a number average molecular weight ($MW_n$) of about 500 to about 15,000 and has the formula:

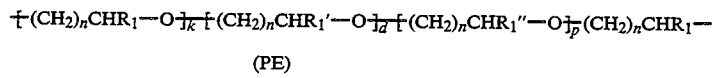

$$\text{-}[(CH_2)_nCHR_1\text{-}O]_k\text{-}[(CH_2)_nCHR_1'\text{-}O]_d\text{-}[(CH_2)_nCHR_1''\text{-}O]_p\text{-}(CH_2)_nCHR_1\text{-}$$

(PE)

wherein n is 1 to 3, k, d, p are integers from 0 to 300, and the sum of k+d+p is 7 to 300, $R_1$, $R_1'$, $R_1''$ are independently of each other H or $CH_3$, with the proviso that if n = 3, $R_1$, $R_1'$, $R_1''$ are hydrogen, thus describing the backbones of poly(ethylene oxide), poly-(propylene oxide) and poly-(n-butylene oxide), but also block-copolymers of the aforementioned alkylene oxides.

a is zero or 1, m is an integer from zero to 2, q is zero or 1, $R_2$ is an linear or branched alkylene with 2 to 4 carbon atoms, Y is $-CONH-R_3-NHCO-$ or $-CO-$, wherein $R_3$ is selected from a divalent aliphatic group with 2 to 14 carbon atoms; a divalent 5- or 6-membered alicyclic group with 5 to 15 C-atoms, or an arylene group with to 14 C-atoms, with the proviso, that if Y is —CO—, a is 1.

Q is selected from, (shown as attached to V):
$Q_1V = $ —CO—V
$Q_2V = $ —CONH—$R_3$—NHCO—X—$R_4$—$X_1$—(-CO)$_b$—V
$Q_3V = $ —CONH—$R_5$OOC—V
$Q_4V = $ —CONH—$R_6$—V
wherein
$R_4$ is an alkylene of 2 to 4 carbon atoms,
$R_5$ is alkylene of 2 to 10 carbon atoms,
$R_6$ is arylene or alkyl-substituted arylene of 6 to 20 carbon atoms,
X is —O— or —$NR_7$—,
$R_7$ is alkyl of 1 to 5 carbon atoms,
$X_1$ is —O—, —NH— or —$NR_7$—,
b is zero or 1,
V is —(CH$_2$)$_c$—CR$_1$=CR$_8$H
c is zero or 1,
$V_1$ has same meaning as V, or is H or $R_9$, when q is zero
$R_8$ is H or —COOH, with the proviso that, if $R_8$ is —COOH, $R_1$ is H, c is zero, and Q is $Q_1$;
$R_9$ is an alkyl of 1 to 18 carbon atoms;
with the further proviso that
when Q is $Q_2$, a is zero;
when Q is $Q_2$, $Q_3$ or $Q_4$, $R_8$ is H;
when c is 1, b is zero, Q is $Q_2$ and $R_1$ and $R_8$ are H; and
when $V_1$ is $R_9$, m is zero.

The foregoing description for A thus includes: poly-(alkylene oxide) diols and $\alpha,\omega$-diaminoalkyl poly(alkylene oxides) (a = 1), of about 500 to about 15,000 molecular weight, optionally chain-extended with diisocyanates (m > 0) and endcapped either directly with vinyl unsaturated isocyanates, preferably 2-isocyanatoethyl methacrylate (IEM) or m-isopropenyl-$\alpha$, $\alpha$-dimethylbenzyl isocyanate (TMI) (Q = $Q_3$ and $Q_4$); included are also the same poly-(alkylene oxides) capped with diisocyanates, followed by reaction with amino- or hydroxyalkyl acrylates, -methacrylates, -acrylamides or -methacrylamides, hydroxyalkyl vinyl ether or allyl alcohol (Q = $Q_2$), as well as direct ester or amides (Q = $Q_1$).

If less than equivalent molar amounts of capping reactants are used, some of the vinyl-telechelic macromers are terminated by vinyl groups only on one end ($V_1$ = H or $R_9$).

Thus, the vinyl unsaturated groups are bonded to the poly-(alkyleneoxide) chain ends, either directly by ester or amide linkages (Q = $Q_1$); by two urethane or urea linkages and one ester or amide linkage (Q = $Q_2$), or by one urethane or urea and one ester linkage (Q = $Q_3$), or by a urea linkage alone (Q = $Q_4$).

Preferred are poly-(alkylene oxide) vinyl unsaturated prepolymers of structures A where Q is of structure $Q_2$, $Q_3$ or $Q_4$; most preferred are prepolymers A where PE is poly-(ethylene oxide), poly-(propylene oxide) or poly-(ethylene oxide-copropylene oxide), and Q is of structures $Q_3$ or $Q_4$ and a is 1.

Preferred vinyl unsaturated groups V are segments of acrylic, methacrylic and styrenic groups, with methacrylic and styrenic groups being most preferred.

Preferred groups $R_3$ are the diradical residues of divalent aliphatic diisocyanates with 6–12 carbon atoms, of divalent cycloaliphatic diisocyanates with 6–15 carbon atoms and of divalent aromatic diisocyanates with 6 to 10 carbon atoms.

Most preferred are the diradical residues of isophorone diisocyanate and of 2,4,4(2,2,4)-trimethylhexane-1,6-diisocyanate.

Preferred groups $R_5$ are ethylene, propylene and butylene, with ethylene being most preferred.

In one embodiment, when QV is $QV_3$, the V—COO—$R_5$— group is a radical whose structure is defined by removing the —NCO group from an isocyanate compound selected from the group consisting of 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

In one embodiment, the V—$R_6$— radical of $Q_4V$ is the radical having a structure defined by removing the —NCO group from 2-isocyanatobutyl vinyl ether, styrene isocyanate, or m-isopropenyl-A,A-dimethylbenzyl isocyanate.

Preferred group $R_6$ are phenylene and $\alpha,\alpha$-dimethylbenzylene with $\alpha,\alpha$-dimethylbenzylene being most preferred.

Useful polyethers PE include: poly-(ethylene oxide) (PEO) diols of 500–12000 MW; poly-(propylene oxide) (PPO) diol of 500–15000 MW; poly-[ethylene oxide (A)-co-propylene oxide (B)]diols of random or block copolymer structure in ratios of A:B from 1:30 to 30:1 and with 500–15000 MW; poly-(tetra-methylene oxide) (PTMO) diols with 500–10000 MW. For example, the polyether PE may be poly (ethylene oxide), poly (ethylene oxide-co-propylene oxide) when a=1 and $R_2$ is —CH$_2$—CH—CH$_3$ and poly (propyleneoxide) when a=1 and $R_2$ is CH$_2$—CHCH$_3$.

It is within the scope of the present invention to use not only the di-functional polyethers of structure A, but also a great variety of tri- or tetrafunctional poly-ether alkanols, as they can be easily prepared by alkoxylation of triols, amines or diamines; tetra-(polyalkylene oxide)-alkanols are for instance known under the tradename TETRONIC (BASF) and are alkylene oxide adducts to ethylene diamine. Also useful are products known as ETHOMEEN (AKZO Chemie) surfactants, which are ethylene oxide adducts to $C_1$-$C_{18}$ alkyl amines. By amination the corresponding tri- or tetra-amines can be prepared, for example, the amination products of propylene oxide adducts to glycerol or trimethylolpropane are available as JEFFAMINE-T from Texaco Chem. Corp. and are also useful in the context of this invention.

Also useful in the context of this invention are fluorinated polyethers of MW 600–5000, for example:
HO—CH$_2$CF$_2$O(C$_2$F$_4$O)$_x$(CF$_2$O)$_y$CF$_2$CH$_2$OH,
wherein x and y are independently of each other integers from 6 to 50, as for instance described in U.S. Pat. No. 4,440,918.

Preferred are $\alpha,\omega$-di-(aminopropyl) poly(ethyleneoxide)diols of 1500–10000 MW; and $\alpha,\omega$-di-(aminopropyl) poly(propyleneoxide)diols (PPO) of 1500–8000 MW and $\alpha,\omega$-di-(aminopropyl)poly-(ethylene oxide-co-propylene oxide)diols of 1500 to 12000 MW. Most preferred are $\alpha,\omega$-di-(aminopropyl)-PEO and $\alpha,\omega$-di-(aminopropyl)-PPO or $\alpha,\omega$-di-(aminopropyl) (ethyleneoxide-co-propyleneoxide)diols of 2000–10000 MW, where the aminopropyl group —$R_2$—NH$_2$ is of structure:

—CH$_2$—CHCH$_3$—NH$_2$

These amino terminated poly(alkylene oxides) are prepared, for example by amination of the corresponding diols and are commercially available under the tradename JEFFAMINE from Texaco Chem. Corp.

Diisocyanates of structure $R_3$—$(NCO)_2$ useful to form the prepolymer intermediate before capping with a reactive vinyl monomer, are aliphatic, cycloaliphatic or aromatic diisocyanates or mixtures thereof (QV may be $Q_2V$ and $Q_2R_3$ is a divalent radical obtained by removing the two —NCO groups) selected from the group consisting of ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatobenzene, bis(4-iso-cyanatocyclohexyl)methane, bis-(4-isocyanatocyclohexenyl)methane, bis(4-isocyanatophenyl)-methane, 2,6- and 2,4-toluene diisocyanate; 3,3-dichloro-4,4'-diisocyanatobiphenyl; tris(4-isocyanatophenyl)methane, 1,5-diisocyanato-naphthalene, hydrogenated toluene diisocyanate; 1-isocyanatomethyl-5-isocyanato-1,3-3-trimethylcyclohexane (= isophorone diisocyanate); 1,3,5-tris(6-isocyanatohexyl)biuret, 1,6-diisocyanato-2,2-4-(2,4,4)-trimethylhexane, 2,2'-diisocyanatodiethyl fumarate; 1,5-diisocyanato-1-carboxypentane; 1,2-, 1,3-, 1,6-, 1,7-, 1,8-, 2,7- and 2,3-diisocyanatonaphthalene; 2,4- and 2,7-diisocyanato-1-methylnaphthalene; 4,4'-diisocyanatobiphenyl; 4,4'-diisocyanato3,3'-diisocyanato-6(7)-methylnaphthalene; 4,4'-diisocyanato-2,2'-dimethyl biphenyl; bis-(4-isocyanatophenyl) ethane; bis(4-isocyanatophenyl ether.

The preferred diisocyanates are isophorone diisocyanate, 2,2,4-(2,4,4)-trimethylhexane-1,6-diisocyanate and 2,4- and 2,6-toluene diisocyanate.

Unsaturated, polymerizable vinyl compounds of structure V-$(CO)_b$—$X_1R_4XH$ useful to react with the NCO-capped poly-(alkylene oxides) contain hydroxy or amino groups and are selected from the groups consisting of acrylic, methacrylic, acrylamido, methacrylamido, vinyl ether, styrene, allyl, maleate, fumarate and itaconate moieties. Typical examples include: 2- and 3-hydroxypropyl acrylate and methacrylate; 4-hydroxybutyl acrylate and methacrylate; glycerol dimethacrylate; hydroxyethyl maleate and fumarate; 2-hydroxyethyl- and 4-hydroxy-butyl vinyl ether; N-(3--hydroxypropyl)-methacrylamide; vinyl-benzyl alcohol; allyl alcohol.

Preferred active hydrogen containing vinyl compounds are 2-hydroxyethyl acrylate and methacrylate and N-tert-butylaminoethyl methacrylate.

Vinyl unsaturated isocyanates of structure V-$COOR_5NCO$ or V-$R_6$—NCO useful to make the vinyl-telechelic poly-(alkylene oxides) in one step include 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

Such compounds and their preparation are disclosed, for example, in U.S. Pat. No. 2,718,516 and British Patent No. 1,252,099.

Other useful isocyanates include isocyanatoalkyl vinyl ethers, such as 2-isocyanatobutyl vinyl ether, and styrene isocyanate and m-isopropenyl-α,α-dimethylbenzyl isocyanate. Also useful are isocyanates obtained by the reaction of one mole of a hydroxy- or aminoalkyl acrylate or methacrylate with one mole of a diisocyanate of structure $R_3(NCO)_2$. Examples of useful such acrylates and methacrylates include 2-hydroxyethyl methacrylate, 2-hydroxyethyl acrylate, 3-hydroxypropyl methacrylate, or t-butylaminoethyl methacrylate; suitable diisocyanates include isophorone diisocyanate, (3,3,4)-trimethylhexane-1,6-diisocyanate, toluene diisocyanate, diphenylmethane-4,4'-diisocyanate and the like.

Most preferred are 2-isocyanatoethyl methacrylate and m-isopropenyl-α,α-dimethylbenzyl isocyanate.

Vinyl-telechelic polyethers with Q of structure $Q_1$ are made, for example, by esterification with acrylic acid, acroyl chloride, acrylic acid anhydride or the methacrylic analog, or by transesterification with methyl acrylate or methacrylate, or by reaction with maleic- or itaconic anhydride or fumaroyl chloride.

The vinyl-telechelic poly-(alkylene oxides) can be used singly or in combination with each other.

The fluorinated and/or silicone containing monomers (B) useful for making the novel polymers of this invention are acrylic or styrenic monomers. Fluorine-containing monomers (B-1) are vinyl monomers containing at least three fluorine atoms consisting of the acrylate or methacrylate esters of the formula $$CH_2=CR_1-COX(CH_2)_r-W-R_f \quad (I)$$

where in $R_f$ is —$(CF_2)_tCF_2L$ or —$(CF_2CF_2)_gOCF(CF_3)_2$ $R_1$ is hydrogen or methyl, X is oxygen or —$NR_7$— wherein $R_7$ is an alkyl group with 1-5 carbon atoms.

r is an integer from 1–4, t is an integer from 0–14, g is an integer from 1–3,

L is hydrogen or fluorine, with the proviso that, when t is 0, L is fluorine, and W is a direct bond or a divalent group of the structure

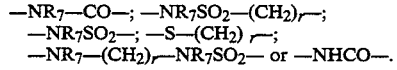
—$NR_7$—CO—; —$NR_7SO_2$—$(CH_2)_r$—;
—$NR_7SO_2$—; —S—$(CH_2)_r$—;
—$NR_7$—$(CH_2)_r$—$NR_7SO_2$— or —NHCO—.

Typical examples are 1,1,2,2-tetrahydroperfluorodecyl acrylates and methacrylate, 1,1,2,2-tetrahydroperfluorooctyl acrylate and methacrylate and 1,1,2,2 tetrahydroperfluorooctyl methacrylamide or acrylamide.

Other useful fluorinated monomers include hexafluoroisopropyl acrylate, hexafluoroisopropyl methacrylate, perfluorocyclohexyl methacrylate, and 2,3,4,5,6-pentafluorostyrene; the acrylates and methacrylates of fluoroalkyl substituted amido-alcohols, such as of $C_8F_{15}CON(C_2H_5)C_2H_4OH$; of sulfonamido-alcohols, such as of $C_8F_{17}C_2H_4SO_2N(CH_3)$—$C_4H_8OH$ and $C_8C_{17}SO_2N(C_2H_5)C_2H_4OH$; of perfluoroether alcohols, such as of $C_3F_7$—$O(C_3F_6O)_2CF(CF_3)$—$CH_2OH$ or $(CF_3)_2CFO(CF_2CF_2)_2$—$CH_2CH_2OH$; and the acrylates and methacrylate of fluorinated thioether alcohols of structure $CF_3(CF_2)_tCH_2CH_2SCH_2CH_2CH_2OH$; acrylates and methacrylates of sulfonamido-amines, such as of $R_fSO_2N(CH_3)CH_2CH_2N(CH_3)(CH_2)_3NH$ and $R_fCH_2SO_2NH(CH_2)_2$; of amido-amines, such as of $R_fCONH(CH_2)_2NH_2$; as well as the vinyl monomers obtained by reaction of these aforementioned fluorinated alcohols and amines with 2-isocyanatoethyl acrylate or methacrylate or m-isopropenyl-α,α-dimethylbenzyl isocyanate.

Preferred are fluorinated monomers in which X is oxygen, W is a direct bond, $R_1$ is hydrogen, r is 2, t is 6 to 10 and L is fluorine; or in which r is 1 or 2, t is 1-4 and L is fluorine, or in which $R_1$ is methyl, r is 2, t is 4 to 10 and L is fluorine. In another embodiment of the compound of structure (I), r is 1 or 2 and t is 4 to 8.

Preferred are hexafluoroisopropyl methacrylate, trifluoroethyl methacrylate, and 1,1,2,2-tetrahydroperfluorooctyl and 1,1,2,2-tetrahydro-perfluorodecyl acrylate and methacrylate, with 1,1,2,2-tetrahydroperfluoro-octyl acrylate being most preferred.

Silicone containing vinyl monomers (B-2) are oligosiloxanylsilylalkyl acrylates and methacrylates containing from 2–10 Si-atoms. Typical representatives include: tris(trimethylsiloxysilyl)propyl (meth)acrylate, triphenyldimethyl-disiloxanylmethyl (meth)acrylate, pentamethyl-disiloxanylmethyl (meth)acrylate, tert-butyl-tetramethyl- disiloxanylethyl (meth)acrylate, methyldi(trimethylsiloxy)silylpropyl-glyceryl (meth)acrylate; pentamethyldi-siloxanyl-methyl methacrylate; heptamethylcyclotetrasiloxy methyl methacrylate; heptamethylcyclotetrasiloxy-propyl methacrylate; (trimethylsilyl)-decamethyl-pentasiloxy-propyl methacrylate; dodecamethyl pentasiloxypropyl methacrylate. Preferably the monomer is tris (trimethylsiloxy-silyl) propyl methacrylate.

The (B-1) fluorine and/or (B-2) silicone containing monomer units as (B) can be present in the polymers of this invention in amounts of 30–84.9%, preferable 30–70%, most preferably 40–60%. When mixtures of (B-1) and (B-2) are used, they are preferably in a weight ratio of 4:1 to 1:4.

The monomers (C) which can be present in the polymers of this invention in amounts from 0–40% can be any copolymerizable vinyl monomer, like an alkyl ester or amide of acrylic or methacrylic acid with from 1–20 carbon atoms in a linear or branched aliphatic, cycloaliphatic or aromatic group containing ester or amide group, and which may be interrupted by heteroatoms like sulfur or oxygen; analogous mono- or di-esters of maleic and itaconic acid; alkyl vinyl ethers with 1 to 10 carbon atoms in the alkyl group, vinyl esters of $C_1$ to $C_{12}$- carboxylic acids; styrene and alkyl substituted styrene and α-methylstyrene; hydroxyalkyl acrylates, methacrylates, acrylamides and methacrylamides; alkyl- and dialkyl-amino-alkyl methacrylates and methacrylamides; hydroxyalkyl vinyl ethers, hydroxyalkyl maleates and itaconates.

These comonomers are preferably present in amounts of 0–40%, most preferably in amounts of 0–20% by weight.

Representative examples include: methyl acrylate, ethyl acrylate, n- and isopropyl acrylate, cyclohexyl acrylate, trimethyl-cyclohexyl acrylate, phenyl acrylate, benzyl acrylate and all the corresponding methacrylates; furfuryl acrylate and methacrylate; methoxy-ethyl-, ethoxy-ethyl-, and ethoxy-ethoxy ethyl acrylate and methacrylate; 2-hydroxyethyl acrylate and methacrylate, 3-hydroxypropyl acrylate, methacrylate and methacrylamide; glycidyl methacrylate; N,N-dimethylacrylamide; N-isopropylacrylamide; N-vinylacetamide; N-vinyl-pyrrolidone; dimethylamino-ethyl methacrylate and methacrylamide; acrylic and methacrylic acid, vinyl sulfonic acid, 4-styrene sulfonic acid and 2-methacrylamido-2-methyl-propane-sulfonic acid and their salts.

Preferred are methoxy-ethyl acrylate and methoxy-ethyl methacrylate, ethoxy-ethyl acrylate and ethoxy-ethyl methacrylate; methyl methacrylate; methyl acrylate, 2-hydroxyethyl methacrylate; N-vinylpyrridone; N,N-dimethylacrylamide and styrene, and ethoxy-ethoxy-ethyl acrylate.

The di- or polyethylenically unsaturated monomers (D) which are essential components of the polymers of this invention contain two or more moieties selected from the groups of acrylates and methacrylates, acrylamides and methacrylamides, vinylethers, styrene, fumarate and itaconate or allyl. Typical representatives include the diacrylates and dimethacrylates of 1,2-ethylene glycol, 1,2- and 1,3-propanediol and of 1,3- and 1,4-butane-, 1,5-pentane- and 1,6-hexanediol; the diacrylates and dimethacrylates of diethylene-, triethylene- and tetraethylene glycol, and of neopentyl glycol, di-(2-hydroxyethyl) sulfone and thiodiethylene glycol; trimethylolpropane triacrylate and trimethacrylate, di-trimethylolpropane tetraacrylate, pentaerythritol tetraacrylate and tetramethacrylate, di-pentaerythritol monohydroxy pentaacrylate; bisphenol-A- and ethoxylated bisphenol-A-dimethacrylate, tris(2-hydroxyethyl)-isocyanurate triacrylate; allyl methacrylate; methylene-bisacrylamide, ethylene-bismethacrylamide, divinylbenzene, allyl methacrylate and butanediol divinylether; also useful are the reaction products of equivalent amounts of aliphatic, cycloaliphatic and aromatic diisocyanates or of vinyl-unsaturated isocyanates with hydroxy or amino substituted acrylates and methacrylates, for example the reaction products of hexamethylene-1,6-diisocyanate, 3,3,4(4,4,3)- trimethylhexane-1,6-diisocyanate, 4,4'-diisocyanato-diphenylmethane or isophorone diisocyanate with two moles 2-hydroxyethyl- or N-t-butyl-2-aminoethyl acrylate or methacrylate, or 3-hydroxypropyl methacrylamide, or of 1 mol 2-isocyanatoethyl methacrylate with 1 mol hydroxyethyl- or N-t-butyl-2-aminoethyl acrylate or methacrylate, or 3-hydroxypropyl methacrylamide. Also useful are silicone containing diacrylates and dimethacrylates, for example bis(-3-methacryloxypropyl) -tetramethyl disiloxane and bis(3-methacryloxypropyl)-tetra(trimethylsiloxy) disiloxane, and fluorinated compounds, like 2-(1-thia-2,2,3,3-tetrahydro)-tridecafluorononyl butane-1,4-diol di(meth)acrylate.

These crosslinking agents can be present in amounts from 0.1–10% by weight, preferably in amounts of 0.5–7% by weight. In another embodiment, the crosslinking agents (D) can be present in amounts from 0.1 to 0.5 percent by weight of the copolymer.

Preferred crosslinking comonomers (D) are ethylene glycol diacrylate and methacrylate, neopentyl glycol di(meth)acrylate, trimethylolpropane triacrylate or methacrylate, allyl methacrylate and divinylbenzene.

Most preferred crosslinking comonomers (D) are ethylene glycol di(meth)acrylate, neopentyl glycol di(meth)acrylate and trimethylolpropane triacrylate.

A preferred embodiment of this invention is a copolymer, wherein component (A) is 15 to 50% by weight and the polyether PE is a poly(ethylene oxide) of 1500–10000 MW, or a poly(ethylene oxide-co-propylene oxide) of 1500–10000 MW and wherein a is 1 and $R_2$ is —CH$_2$—CHCH$_3$—, wherein QV is $Q_3V$ or $Q_4V$, and V—COO—$R_5$— is the radical obtained by removing the —NCO group from 2-isocyanatoethyl methacrylate or 2-isocyanatoethyl acrylate, and wherein V—$R_6$— is the radical obtained by removing the —NCO group from styrene isocyanate or m-isopropenyl-α,α-dimethylbenzyl isocyanate; component (B) is 50 to 84.5% by weight of component (B-1), wherein (B-1) is a fluorinated monomer selected from the group consisting of hexafluoroisopropyl acrylate, hexafluoroisopropyl methacrylate, or is a fluorine containing monomer containing at least three fluorine atoms and having the formula $$CH_2=CR_1-COX(CH_2)_r-W-R_f$$

wherein

W is a direct bond, X is oxygen and $R_f$ is $-(CF_2)_tCF_2L$ $R_1$ is hydrogen or methyl, r is an integer from 1–4, t is an integer from 0–10, L is hydrogen or fluorine, with the proviso that, when t is 0, L is fluorine, and component (C) is 0 to 20% by weight and component (D) is 0.5 to 7% by weight.

Synthesis

The vinyl-telechelic poly-alkylene oxides (A) may be prepared, either, most easily, in one step by the reaction of poly-(alkylene oxide) diols or diamines with the halide, anhydride or lower alkyl ester of acrylic, methacrylic, maleic or itaconic acid, or an isocyanatoalkyl acrylate or methacrylate or a styrene isocyanate, or alternatively, in two steps, by reaction with, first, an organic diisocyanate followed by, secondly, reaction with a hydroxy- or amino functional alkyl acrylate, alkyl methacrylate, alkyl maleate, alkyl itaconate, alkyl vinyl ether, allyl compound or styrene. Preferably, the vinyl-telechelic poly-(alkylene oxides) are synthesized by reaction of the poly-(alkylene oxide) diols or diamines with vinyl-unsaturated isocyanates. For urethane bond formation, catalysts are used in amounts from 0.01–0.5%. Typical catalysts include stannous octoate or dibutyltin dilaurate (DBTL), or tert.-amines like triethylamine.

Copolymerization of the vinyl-telechelic poly-(alkylene oxides) (A) with comonomers (B), (C) and (D) may be carried out by employing initiators which generate free-radicals on application of an activating energy as is conventionally used in the polymerization of ethylenically unsaturated monomers. Included among free-radical initiators are the conventional thermally activated initiators such as organic peroxides and organic hydroperoxides. Representative examples of such initiators include benzoyl peroxide, tertiary-butyl perbenzoate, diisopropyl peroxydicarbonate, cumene hydroperoxide, azobis(isobutyronitrile), and the like. Generally, from about 0.01 to 5 percent by weight of thermal initiator is used.

Preferably, UV-initiated polymerization is carried out, using photoinitiators. Such initiators are well known and have been described, for example, in polymerization art, e.g., Chapter II of "Photochemistry" by Calvert and Pitts, John Wiley & Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether and a-methylbenzoin; diketones such as benzil and diacetyl, etc.; ketones such as acetophenone, α,α,α-tribromoacetophenone, α,α-diethoxyacetophenone (DEAP), 2-hydroxy-2-methyl-1-phenyl-1-propanone, o-nitro-α,α,α-tribromoacetophenone, benzophenone and p,p'-tetramethyldiaminobenzophenone; a-acyloxime esters such as benzil-(O-ethoxycarbonyl)-a-monoxime; ketone/amine combinations such as benzophenone/N-methyldiethanolamine, benzophenone/tributylamine and benzophenone/Michler's ketone; and benzil ketals such as benzil dimethyl ketal, benzil diethyl ketal and 2,5-dichlorobenzil dimethyl ketal. Normally, the photoinitiator is used in amounts ranging from about 0.01 to 5% by weight of the total oligomeric composition.

Preferably, about 0.1 to 1.0% of photoinitiator is used in the polymerizable compositions.

Polymerization may be carried out in bulk in a conventional manner or in the presence of a solvent. Especially in case of poly-(ethylene oxide) as (A) building block, cosolvents are usually required to compatibilize components (A) and (B). The amount of solvent required depends on the nature and relative amounts of (A) and (B), but also on the choice of comonomer (C), which can act as a solvent for (A) and (B). Useful solvents to carry out the polymerization include ketones, like acetone, methylethyl ketone, methyl propyl ketone, methyl isobutyl ketone and cyclohexane; alcohols like ethanol, isopropanol or ethylcellosolve; ethers like ethylene glycol or diethylene glycol dimethyl ether; esters like ethyl acetate or isopropyl acetate; dimethyl sulfoxide; N-methylpyrrolidone; N,N-dimethylformamide; N,N-dimethylacetamide and the like.

The polymerization is carried out in molds, which can consist of plastics, glass or metal and can be any shape. For making films and sheets, the molds are preferably made of glass plates and lined with MYLAR or other polymer films and held together by clamps, using a spacer of desired thickness. Contact lenses are preferably prepared in UV-permeable plastic molds.

After polymerization is complete, the polymer is removed from the mold and any solvent present is either removed by vacuum drying or extraction with water and with water-soluble solvents, or water-solvent mixtures. Useful solvents are acetone, ethanol, methanol, isopropanol and the like. Azeotropic distillation is also a useful procedure to remove certain solvents. After the solvent is removed the polymer is equilibrated in distilled water and its water content is determined gravimetrically. All subsequent measurements are carried out on the water-equilibrated polymers.

In the following examples bending angle is determined on 2.5 × 0.5 inch 1 mm thick, cast sheets by determining the angle formed by a 2 inch overhang and the horizontal. Oxygen permeability is measured with a $O_2$-Permeometer-Model 201-T (Createch), using buffered saline (pH = 7) as electrolyte and is expressed in units $$O_2.DK \text{ (barrers)} = \frac{cm^3 \text{ (STP) } cm \cdot 10^{-10}}{cm^2 \cdot sec \cdot cmHg}$$

at a given temperature and sample thickness.

Physical-mechanical measurements are carried out with an INSTRON testing apparatus, model 1123 on 0.6–1 mm thick sheets.

Water content is expressed as:

$$\% H_2O = \frac{\text{weight of swollen polymer} - \text{weight of dry polymer}}{\text{weight of swollen polymer}}$$

Examples 1–25 describe the synthesis of fluorine or silicone containing poly-(ethylene oxide) block copolymer hydrogels.

Example 1

Synthesis of Poly-(ethylene oxide)-urethane Dimethacrylate 120 g (0.0358 m) Poly-ethylene oxide diol (PEO) of MW 3350 are filled into a 500 cc round bottom flask, equipped with a magnetic stirring bar, gas-inlet tube, thermometer and heating mantle. The PEO is heated to 80° C. and the molten resin is stirred for 2 hours at a vacuum of & 0.05 - 1 mm Hg; the mixture is slowly cooled to 50° C. and the vacuum broken with dry air. 60 g Isopropyl acetate (IPAC) are added and a clear solution is formed.

11.18 g (0.072 m) 2-Isocyanatoethyl methacrylate and 21.8 g isopropyl acetate are filled into an addition funnel and are slowly added to the PEO solution. 50 g IPAC are used to rinse the funnel. After addition is complete, 0.071 g dibutyl-tin dilaurate (DBTL) (0.15 mol %) are added and the mixture is stirred at 50° C. under dry air for three hours or until all NCO has been consumed as determined by IR-analysis. The product is allowed to cool down and crystallize and 60 g IPAC are added to form a slurry. The slurry is filtered and dried to a white powder, weighing 128.4 g (98% of theory).

Example 2

Using the same procedure as described in Example 1, a PEO-di(urethane-methacrylate) is prepared, using poly-(ethylene oxide) diol of 1450 MW.

Example 3

Synthesis of Si-containing Poly-(ethylene oxide) Block Copolymers 5 g of the PEO-dimethacrylate of Example 1 are mixed with 5 g tris-(trimethylsiloxy-silyl)-propyl methacrylate (Si4MA), 4 g N-methylpyrrolidone (NMP), 6 g methyl ethyl ketone (MEK) and 0.4 % benzoin methyl ether (BMI) as UV initiator. The solution is degassed by vacuum which then is broken with dry nitrogen and is filled into a 0.5 mm wide MYLAR lined glass mold held together by clamps, after which it is finally polymerized by exposure to UV radiation from a SYLVANIA Black-Lite Blue lamp for 8 hours.

The clear polymer sheet is removed from the mold and the solvent is exchanged with water first by immersion for 12 hours in distilled water, followed by one hour boiling and equilibration for 48 hours.

A clear, flexible hydrogel is obtained which contains 54.4% water, has a bending angle of 58° and an oxygen permeability DK of 52 barrers.

Example 4

Synthesis of poly-ethylene oxide dimethacrylate from $\alpha,\omega$-di(1-methyl-aminoethyl)poly-(ethylene oxide).

57.68 g (0.020 M) of a $\alpha,\omega$-di(1-methyl-aminoethyl)-poly-(ethylene oxide) of MW 2884 and 57.7 g of anhydrous methyl propyl ketone are charged into a 3-neck round bottomed flask which has been equipped with a stirrer, nitrogen inlet, condenser, thermometer and dropping funnel. The solution is stirred at room temperature under dry nitrogen. Then 6.20 g (0.04 mole) of 2-isocyanatoethyl methacrylate (MW 155) dissolved in 6.2 g of anhydrous methylpropyl ketone are added slowly from the dropping funnel. The mildly exothermic reaction is maintained at 35° C. and below by water bath cooling for 1 hour at which time an IR analysis shows the reaction to be complete.

Examples 5

Following the procedure of Example 3, the PEO-urea dimethacrylate of Example 4 is mixed with various fluorinated comonomers (F.-mon) and other comonomers, using methyl propyl ketone (MPK) as a solvent. 0.5% Benzoin methyl ether is added. The mixtures are degassed, filled into 1 mm thick mold and cured for 8 hours by UV. The polymer sheets are removed from the mold, extracted for 24 hours by swelling in ethanol, boiled for 1 hour in distilled water followed by equilibration in water. Compositions and test results are shown in the following table.

Examples 5-13
Following the procedure of Example 3, fluorine containing PEO-block copolymer hydrogels are synthesized and their properties are determined using the fluorinated monomers and solvent compositions shown in the Table;

| | Monomers, %[1] | | | Solvents | | | | |
|---|---|---|---|---|---|---|---|---|
| Ex. No. | PEO-dimethacrylate of Ex.; | % | Si, F-containing Comonomer | Other % | NMP/MEK %/% | [P][2] % | $H_2O$ % | Bending Angle° | $O_2$.DK (barrers) |
| 5 | 1 | 50 | $R_fA$, 50 | — | 35/65 | 40 | 70.0 | 52 | 56 |
| 6 | 1 | 38 | $R_fA$, 39 | MMA 23 | 40/60 | 50 | 49.3 | 25 | 27 |
| 8 | 1 | 40 | Si4MA, 10: $R_fA$ 30 | MMA 20 | 42/58 | 51 | 55.3 | 55 | 37 |
| 9 | 1 | 30 | $R_fA$ 60 | MMA 10 | 26/74 | 47 | 51.6 | 28 | 40 |
| 10 | 2 | 50 | Si4MA, 50 | — | 70/30 | 42 | 44.0 | 22 | 43 |
| 11 | 2 | 50 | $R_fA$, 50 | — | 45/55 | 25 | 55.1 | 50 | 36 |
| 10 | 1 | 59 | $R_fA$, 41 | — | 35/65 | 37 | 71.0 | 43 | 43 |
| 12 | 1 | 50 | $F_7MA$, 50 | — | 50/50 | 50 | 57.2 | 15 | 35 |
| 13 | 1 | 50 | $F_6MA$, 50 | — | 50/50 | 50 | 59.7 | 17 | 34 |

[1])$R_fA$ is $C_nF_{2n+2}$—$CH_2CH_2OOC$—$CH=CH_2$, with n = 6/8/10/12 in weight percent of 0.5/75./22./2.5
Si4MA is tris-trimethylsiloxy-silyl-propyl methacrylate
$F_7MA$ is heptafluorobutyl methacrylate
$F_6MA$ is hexafluoroisopropyl methacrylate
MMA is methyl methacrylate
DMA is N,N-dimethlacrylamide
[2])[P] is polymer (monomer) concentration is solvent.

Example 14

Using the procedure of Example 3, selected PEO-block copolymers are synthesized in 1 mm wide MYLAR lined molds and their physical-mechanical properties are measured and reported in the following table.

| Polymer of Ex. | H$_2$O % | Tensile Strength kg/cm$^2$ | Young's Modulus kg/cm$^2$ | Elongation % |
|---|---|---|---|---|
| 3 | 54.4 | 6.3 | 13.6 | 106 |
| 6 | 49.3 | 33.0 | 93.4 | 63 |
| 11 | 71.0 | 4.6 | 25.0 | 20 |
| 12 | 57.2 | 25.1 | 106.0 | 29 |
| 13 | 59.7 | 16.6 | 69.4 | 28 |

Example 15

The hydrolytic stability of PEO-block copolymers is evaluated by aging in pH 7.4 phosphate-buffered saline solution at 80° C. for 132 hours and measuring physical properties before and after aging. The results are shown in the Table.

| Polymer Example | | H$_2$O % | Tens. Str. kg/cm$^2$ | Y. Mod. kg/cm$^2$ | El % | Bending Angle |
|---|---|---|---|---|---|---|
| 9 | initial: | 44 | 8.9 | 28 | 65 | 26 |
|   | aged: | 43 | 7.0 | 26 | 50 | 30 |
| 10 | initial: | 55 | 2.7 | 17 | 38 | 50 |
|    | aged: | 56 | 3.0 | 17 | 25 | 50 |

Examples 16–25

Following the procedure of Example 3, the PEO-urea dimethacrylate of Example 4 is mixed with various fluorinated comonomers (F.-mon) and other comonomers, using methyl-propyl ketone (MPK) as a solvent. 0.5% Benzoin methyl ether is added. The mixtures are degassed, filled into 1 mm thick mold and cured for 8 hours by UV. The polymer sheets are removed from the mold, extracted for 24 hours by swelling in ethanol, boiled for 1 hour in distilled water followed by equilibration in water. Compositions and test results are shown in the following table.

round bottomed flask, equipped with stirrer, nitrogen inlet, condenser, thermometer and dropping funnel. The solution is stirred at room temperature under dry nitrogen while 6.20 g (0.040 m 2-isocyanatoethyl methacrylate (IEM) are slowly added. The mildly exothermic reaction mixture is maintained at 35° C. by water bath cooling for one hour after which time IR analysis shows the reaction to be complete.

Example 27

Following the procedure of Example 26, a methacrylate terminated poly(propylene oxide) prepolymer is prepared from α,ω-di-(1-methyl-amino ethyl)-poly-(propylene oxide) of MW 4408.

Example 28

The procedure of Example 26 is repeated, but using m-isopropenyl-α,α-dimethylbenzyl isocyanate (TMI) as the vinyl-unsaturated isocyanate.

Example 29

The procedure of Example 27 is repeated, but using m-isopropenyl-α,α-dimethylbenzyl isocyanate (TMI) as the vinyl-unsaturated isocyanate.

Examples 30–32

Synthesis of chain extended, methacrylate-terminated poly-(propylene oxide).

100.75 g (0.048 m) of α,ω-Di-(aminopropyl)-poly-(propylene oxide) of MW 2099 (Jeffamine-ED2000, Texaco Chem. Corp.) are charged into a 3-necked round bottomed flask which is equipped with a stirrer, nitrogen inlet, condenser, thermometer and dropping funnel. The solution is stirred at room temperature under dry nitrogen. 1.26 g (0.006 m) 2,2,4(2,4,4) trimethylhexane-1,6-diisocyanate (TMDI) are added and the reaction mixture is kept at 28° C. for 2 hours, by which time all NCO-groups are reacted, as determined by Examples 16–25

| Ex. No. | Macromer of Ex. 4 % | F-mon % | MMA % | MOEA % | XL % | [Pol] % | H$_2$O % | Bend. | T. Str kg/cm$^2$ | Y. Mod. kg/cm$^2$ | Elong. % | O$_2$.DK Barriers at mm/°C. |
|---|---|---|---|---|---|---|---|---|---|---|---|---|
| 16 | 40 | C$_4$FA 40 | 20 | — | — | 57.8 | 44.7 | 37 | 9.3 | 23.8 | 117 | 21 .4/20 |
| 17 | 30 | R$_f$A 50 | 20 | — | — | 55.5 | 48.8 | 58 | 5.3 | 6.3 | 274 | 30 .4/20 |
| 18 | 30 | C$_6$FA 50 | 20 | — | — | 67.1 | 32.7 | 33 | 17.8 | 31.9 | 253 | 41 .1/21 |
| 19 | 30 | R$_f$A 50 | 19.8 | — | .2 | 56.6 | 41.1 | 44 | 10.8 | 22.2 | 242 | 41 .1/23 |
| 20 | 30 | R$_f$A 60 | 9.8 | — | .2 | 50.2 | 44.2 | 43 | 7.6 | 17.6 | 87 | 55 .1/23 |
| 21 | 30 | R$_f$A 60 | — | 10 | .2 | 51.8 | 46.3 | 49 | 6.3 | 14.1 | 88 | 33 .45/20 |
| 22 | 30 | R$_f$A 50 | — | 19.8 | .2 | 54.1 | 43.9 | 38 | 3.7 | 12.9 | 47 | 45 .1/23 |
| 23 | 35 | R$_f$A 45 | — | 20 | — | 54.6 | 47.9 | 55 | 3.1 | 13.2 | 34 | 35 .99/20 |
| 24 | 40 | R$_f$A 40 | — | 20 | — | 56.3 | 51.3 | 45 | 2.4 | 15.5 | 18 | 33 .97/20 |
| 25 | 30 | R$_f$A 45 | — | 25 | — | 55.7 | 44.6 | 55 | 4.8 | 10.7 | 117 | 35 .96/22 |
| p-HEMA, for comparison | | | | | | | 39.0 | 60 | 3.0 | 5.5 | 90 | 6 .25/22 |

Abbreviations:
MMA = methyl methacrylate
MOEA = methoxy-ethyl acrylate
R$_f$A = R$_f$ethyl acrylate
R$_f$ = C$_n$F$_{2n+1}$, n = 6/8/10/12 = 5.4/72.8/20.8/0.9, in % (w/w).
XL = ethyleneglycol dimethacrylate
C$_6$FA = R$_f$A with n = 6
[POL] = polymer % in MPK Examples 26–50 describe the synthesis of silicone and/or fluorine containing poly-(propylene oxide) block copolymers.

Example 26

41.98 g (0.020 m) α,ω-Bis-(aminopropyl)-poly(propylene oxide) of MW 2099 are charged into a 3-necked IR-analysis, yielding a partially chain extended prepolymer containing PPO and TMDI in a mol ratio of 8:1. Then 13.03 g (0.084 m) of 2-isocyanatoethyl methacrylate (IEM) (MW 155) are added slowly from the dropping funnel. The mildly exothermic reaction is maintained at 35° C and below by water bath cooling for 1 hour, at which time an IR analysis shows the reaction to be complete.

By the same procedure, chain extended IEM-capped PPO-prepolymers are prepared, containing PPO and boiling water for one hour and equilibrated in distilled water.

The polymer compositions thus prepared and their properties are listed in the table.

Examples 41–50

| Ex. No. | Macromer of Ex. 4 % | Mac. % | Composition F-mon | % | M-3 | % | $H_2O$ % | T. Str. $kg/cm^2$ | Y. Mod. $kg/cm^2$ | Elong. % | $O_2.DK$ Barrers at mm/°C. |
|---|---|---|---|---|---|---|---|---|---|---|---|
| 41 | 28 | 22.2 | $R_fA$ | 22.2 | MA | 55.6 | 4.4 | 4.0 | 11.5 | 50 | 42, .91/23 |
| 42 | 28 | 22.3 | $R_fA$ | 22.2 | MOEA | 55.6 | 3.1 | 8.0 | 17.6 | 115 | 40, .90/23 |
| 43 | 28 | 22.2 | $R_fA$ | 22.2 | EOEA | 55.6 | 3.1 | 2.6 | 9.7 | 33 | 40, 1.0/23 |
| 44 | 28 | 25 | $R_fA$ | 25 | EOEMA | 50 | 2.6 | 4.8 | 11.9 | 69 | 35, .95/23 |
| 45 | 26 | 25 | $C_6FA$ | 25 | EOEA | 50 | 2.2 | 5.3 | 11.2 | 78 | 35, .97/22 |
| 46 | 26 | 25 | $C_6FA$ | 25 | EOEMA | 50 | 2.4 | 8.3 | 12.7 | 125 | 23, .95/22 |
| 47 | 27 | 33 | $C_6FA$ | 33 | EOEA | 34 | 2.2 | 5.5 | 9.0 | 123 | 58, 1/23 |
| 48 | 27 | 33 | $C_6FA$ | 33 | EOEMA | 34 | 2.1 | 5.3 | 9.2 | 129 | 44, 1/23 |
| 49 | 27 | 33 | $C_6FA$ | 32 | MOEA | 36 | 2.8 | 4.8 | 9.2 | 104 | 45, 1/23 |
| 50 | 27 | 31 | $C_6FA$ | 31 | EOEOEA | 34 | 3.0 | 4.6 | 9.3 | 86 | 68, 1/24 |

$R_fA$, $C_6FA$ and MOEA are as described in Example 16;
EOEA is ethoxy-ethyl acrylate
EOEMA is ethoxy-ethyl methacrylate
EOEOEA is ethoxy-ethoxy ethyl acrylate
MA is methyl acrylate TMDI in mol ratios of:
Example 31: 5/1 (PPO/TMDI)
Example 32: 4/1 (PPO/TMDI Examples 33–40

Following the procedure of Example 3, the poly(propylene oxide)-dimethacrylates of Examples 26–32 are mixed and reacted with fluorinated comonomers and other comonomers, in the presence of methyl-propyl ketone (MPK) as a solvent; 0.4% benzoin methyl ether (BME) and 8 hours UV-exposure are used for curing. After polymerization, the clear polymer sheets are removed, boiled in water for one hour to strip off unreacted monomer and solvent, and equilibrated in distilled water.

The polymer compositions thus prepared and their properties are shown in the table.

Example 51

99.0 g (0.050 m) Poly-(butylene oxide) diol of MW 1980 are charged into a 3-necked round bottomed flask, equipped with stirrer, nitrogen inlet tube, condenser thermometer and dropping funnel. 0.03 g Dibutyltin dilaurate are added and the solution is stirred at room temperature under dry nitrogen while 16.28 g (0.105 m) 2-isocyanatoethyl methacrylate (IEM) are slowly added. The mildly exothermic reaction mixture-is maintained at 35° C. for one hour, after which time IR-analysis shows no free remaining NCO-groups.

A 0.5 mm thick polymer sheet is cast following the procedure of Example 3, which has the following composition and properties:

Examples 33–40

| Ex. No. | Macromer of Ex. %; | Composition % F-mon | M-3 % | [P] % | $H_2O$ % | T. Str. $kg/cm^2$ | Y. Mod. $kg/cm^2$ | Elong. % | $O_2.DK$ Barrers, at mm/°C. |
|---|---|---|---|---|---|---|---|---|---|
| 33 | 26; | 40 $R_fA$ 40 | DMA 20 | 69 | 21.4 | 3.5 | 23.5 | 20 | 36, .92/24 |
| 34 | 26; | 40 $R_fA$ 40 | MMA 20 | 75 | 3.1 | 11.9 | 30.9 | 98 | 20, .95/24 |
| 35 | 30; | 40 $R_fA$ 40 | MMA 20 | 75 | 3.0 | 12.5 | 31.7 | 112 | 22, .95/25 |
| 36 | 31; | 40 $R_fA$ 40 | MMA 20 | 75 | 3.0 | 14.1 | 37.0 | 130 | 25, .95/25 |
| 37 | 32; | 40 $R_fA$ 40 | MMA 20 | 75 | 2.6 | 25.7 | 43.3 | 278 | 23, .95/25 |
| 38 | 27; | 40 $R_fA$ 40 | MOEA 20 | 74 | 2.3 | 8.0 | 14.0 | 122 | 48, .92/24 |
| 39 | 27; | 40 $C_8FA$ 40 | MOEA 20 | 74 | 2.9 | 7.2 | 12.6 | 175 | 37, .4/22 |
| 40 | 27; | 40 $C_6FA$ 40 | EOEMA 20 | 75 | 1.9 | 4.8 | 6.8 | 151 | 51, .87/22 |

$R_fA$, MMA, MOEA, [P] are as described in Example 16.
DMA is dimethylacrylamide
$C_8FA$ and $C_6FA$ are $R_fA$ with n = 6 and 8.
M-3 are other comonomers
EOEMA is ethoxy-ethyl methacrylate Examples 41–50

Following the procedure of Example 3, the poly(propylene oxide)-dimethacrylates of Examples 26, 27 and 28 are mixed and reacted with fluorinated comonomers and other comonomers, but no solvent is used. To the clear mixtures are added 0.2% benzoin methyl ether (BME), and 5 hours UV exposure is used for the polymerization step. After polymerization, the clear polymer sheets are removed from the molds, immersed in poly-butyleneoxide-dimethacrylate: 25%
$C_6F_{13}CH_2CH_2OOC$—CH=$CH_2$: 25%
methoxyethyl acrylate: 50%

Physical properties

Tensile Strength: 6.8 kg/cm2
Youngs Modulus: 16.7 kg/cm2
Elongation: 66%
$O_2.DK$: 13 barrers (.4 mm/20°C.)
Water absorption is 1.4%

Example 52

428.0 g (0.2223 m) Poly-(butylene oxide) diol of MW 1925 are charged into a 3-necked round bottomed flask, equipped with stirrer, nitrogen inlet tube, condenser, thermometer and dropping funnel. 0.050 g Dibutyltin dilaurate are added and the solution is stirred at room temperature under dry nitrogen, while 98.7 g (0.447 m) isophorone diisocyanate (IPDI) are slowly added. The mildly exothermic reaction mixture is maintained at 35° C. for 1.5 hours, after which time NCO-titration shows the free remaining NCO-groups to be one half of their original concentration. 60.3 g (0.463 m) 2-Hydroxyethyl methacrylate are added to the reaction mixture which is then stirred at 30°–35° C. for 22 hours, after which time no free NCO can be detected by IR analysis.

A 0.5 mm thick polymer sheet is cast following the procedure of Example 3, which has the following composition and properties:

| | |
|---|---|
| poly-butyleneoxide-dimethacrylate: | 33% |
| $C_6F_{13}CH_2CH_2OOC-CH=CH_2$: | 33% |
| methoxyethyl acrylate: | 34% |
| Physical properties | |
| Tensile Strength | 6.9 kg/cm2 |
| Youngs Modulus | 14.7 kg/cm2 |
| Elongation | 74% |
| $O_2$.DK: | 20 barrers (.4 mm/20°C.) |
| Water absorption is 1.8% | |

Examples 53 and 54

Synthesis of PEO-di(urea-methacrylate) copolymers with $R_f$-ethyl acrylate or tris (trimethylsiloxy-silyl)-propyl methacrylate.

1. Synthesis of PEO ($MW_N$ 6000) di(urethane-methacrylate)

59.95 g (0.010 m) α,ω-di(1-methyl-aminoethyl) poly-(ethylene oxide-co-propyleneoxide) of MW 5995 (Jeffamine-ED 5000, TEXACO Corp.) and 59.95 g of anhydrous methyl propyl ketone are charged into a 3-necked round bottomed flask equipped with a stirrer, nitrogen inlet, condenser, thermometer and dropping funnel. The solution is stirred at room temperature under dry nitrogen. Then 3.10 g (0.020 mole) of 2-isocyanotoethyl methacrylate (MW 155) dissolved in 3.1 g of anhydrous methyl propyl ketone are added slowly from the dropping funnel. The mildly exothermic reaction is maintained at 35° C. and below by water bath cooling for 1 hour at which time an IR analysis shows the reaction to be complete.

2. Following the procedure of Example 3, the PEO-dimethacrylate is reacted with a fluorinated and a silicone containing comonomer, using methyl-propyl ketone as a solvent. The clear polymer sheets are worked up as described and tested; $C_6FA$ is $C_{16}F_{13}$-ethylacrylate; $Si_4MA$ is tris-(trimethylsiloxy-silyl)-propyl methacrylate:

| Ex. Nr. | Composition % | | | | $H_2O$ % | INSTRON Data | | | $O_2$.DK barrers |
|---|---|---|---|---|---|---|---|---|---|
| | Mac. | $C_6FA$ | $Si_4MA$ | MOEA | | T. Str. kg/cm² | Y. Mod. kg/cm² | El. % | |
| 53 | 30 | 50 | — | 20 | 51.3 | 2.3 | 3.1 | 119 | 51 |
| 54 | 40 | — | 40 | 20 | 57.7 | 3.3 | 3.3 | 227 | 47 |

$C_6FA$, $Si_4MA$, MOEA, are defined in examples 5 and 16.

Example 55

Synthesis of PEO (MW N 6000) di(urea-α,α-methyl styrene)

59.95 g (0.010 m) of α,ω-di-(1-methyl-aminoethyl)-poly-(ethylene oxide) of MW 5995 (Jeffamine-ED 6000) and 59.95 g of anhydrous methyl propyl ketone are charged into a 3-necked round bottomed flask which has been equipped with a stirrer, nitrogen inlet, condenser, thermometer and dropping funnel. The solution is stirred at room temperature under dry nitrogen, then 4.02 g (0.020 mole) of m-isopropenyl-α,α-dimethyl-benzyl isocyanate (MW 201) dissolved in 3.1 g of anhydrous methylpropyl ketone are added slowly from the dropping funnel. The mildly exothermic reaction is maintained at 35° C. and below by water bath cooling for 1 hour, at which time an IR analysis shows the reaction to be complete.

Examples 56–59

Following the general procedure of Example 3, but using 25% methyl-propyl ketone as solvent, and using the PEO-macromers of Examples 53 and 55, fluorinated copolymer hydrogels are prepared and their properties measured.

| Ex. No. | Composition | | | | $H_2O$ % | Instron data | | | $O_2$.DK barrers at mm/°C. |
|---|---|---|---|---|---|---|---|---|---|
| | Macromer of Ex. | $C_6FA$ % | % | M-3, % | | T. Str. kg/cm² | Y. Mod. kg/cm² | Elong % | |
| 56 | 53 | 40 | 40 | MOMA 20 | 58.0 | 4.8 | 3.9 | 298 | 41 .5/17 |
| 57 | 53 | 40 | 40 | MOA 20 | 58.2 | 2.3 | 4.2 | 70 | 42 .5/17 |
| 58 | 55 | 40 | 40 | MOMA 20 | 61.6 | 2.4 | 1.8 | 261 | 40 .5/17 |
| 59 | 55 | 40 | 40 | MOA 20 | 60.5 | 3.7 | 5.9 | 102 | 41 .5/17 |

$C_6FA$ is $C_6F_{13}-CH_2CH_2-OOC-CH=CH_2$
MOMA is methoxy-ethyl methacrylate
MOA is methoxy-ethyl acrylate

Example 60

Synthesis of PEO ($MW_N$ 8000) di(urethane-methacrylate)

Following the procedure of example 54/1, 80.7 g (0.010 m) α,ω-di(1-methyl-aminoethyl) poly-(ethyleneoxide-co-propyleneoxide) (Jeffamine-ED 6000, TEXACO Corp.) of MW 8069 and 3.10 g (0.020 mole) of 2-isocyanotoethyl methacrylate (MW 155) are reacted to give the corresponding polyether-dimethacrylate.

Example 61

Using the procedure described above, 80.7 g (0.010 m) α,ω-di(1-methyl-aminoethyl) poly-(ethyleneoxide-co-propyleneoxide) (Jeffamine-ED 6000, TEXACO Corp.) of MW 8069 and 4.02 g (0.020 mole) of m-isopropenyl-α,α-dimethylbenzyl isocyanate (MW 201) are reacted to give the corresponding α-methylstyrene terminated polyether. Synthesis of polymers with crosslinked hydrophobic domains.

Examples 62 to 73

Following the procedure of Example 3, the PEO-urea dimethacrylate (PEO-MAC) of Example 4 is mixed with tridecafluorohexyl-ethyl acrylate ($C_6FA$) and, in addition, various amounts of ethyleneglycol dimethacrylate (EDMA) as crosslinking comonomer, resulting in the polymer compositions shown in the table. Methyl propyl ketone (MPK) is used as solvent and 0.5% benzoin methyl ether as initiator. Polymerization and work-up of the polymer sheets is carried out as described.

Compositions and test results are shown in the following two tables.

| Example Nr. | Composition % PEO-MAC | $C_6FA$ | EDMA | Water % | $O_2$-DK | Appear |
|---|---|---|---|---|---|---|
| 62 | 30 | 70 | — | 53 | 57 | clear |
| 63 | 29.97 | 69.93 | 0.1 | 53 | 57 | clear |
| 64 | 29.94 | 69.86 | 0.2 | 53 | 58 | clear |
| 65 | 29.85 | 69.65 | 0.5 | 51 | 56 | clear |
| 66 | 29.7 | 69.7 | 1.0 | 52 | 50 | clear |
| 67 | 29.4 | 68.6 | 2.0 | 48 | 43 | clear |
| 68 | 28.5 | 66.5 | 5.0 | 45 | 31 | hazy |
| 69 | 24.5 | 73.5 | 2.0 | 44 | 51 | clear |
| 70 | 33.6 | 62.4 | 4.0 | 52 | 33 | clear |
| 71 | 38 | 57.0 | 5.0 | 55 | 46 | hazy |
| 72 | 38.4 | 57.6 | 4.0 | 58 | 48 | clear |
| 73 | 47.5 | 47.5 | 5.0 | 61 | 42 | clear |

The following examples show the synthesis of contact lenses.

Example 74

The monomer-macromer solutions in methyl propyl ketone of Examples 63, 64, 65, 66, 67 and 68 are filled into poly-propylene contact lens molds which are closed and clamped together in a metal mold-holder. The molds are exposed to UV light from a SYLVANIA Blacklite-Blue lamp for four hours, after which time the molds are disassembled and the molded lenses are released into a 50% aqueous isopropanol solution for a 12 hour extraction of unreacted monomers. Following that the lenses are in three diluting steps equilibrated in deionized water and finally equilibrated in phosphate-buffered saline solution.

The lenses had an average thickness of 100 microns; ease of handling and combination of flexibility and stiffness the lenses are rated by comparing their ability to hold their shape and remain smooth and flexible, with that of a commercial poly-HEMA type lens (CARMEN; 86 microns center diameter; from CIBA VISION); in a rating from 1 to 5, 1 equals poly-HEMA, while 5 is the lowest rating, indicating a complete collapse of the lens shape due to insufficient modulus. The cast lenses are rated: Examples 67 and 64: 1; Examples 63 and 66: 3; examples 68 and 65: 4.

Example 75 - 88

Following the procedure of Example 74, lenses are prepared from monomer-macromer solutions of Examples 60 and 61. In the table, $C_6FA$ is $C_6F_{13}CH_2CH_2OOC-CH=CH_2$, EDMA is ethyleneglycol dimethacrylate; $F_{ex}$ is the expansion factor of the lens after equilibration in saline solution and defined as lens diameter / mold diameter; oxygen permeabilities are measured only on lenses with a quality rating of at least 2 and are expressed as DK-Ratio of: sample lens DK/poly-HEMA lens DK; $DK_{p-HEMA}$ was 5.3 at 86 microns.

| Example Nr. | PEO-Mac. Ex. Nr.; | % | $C_6FA$ % | EDMA % | Lens Rating | $F_{ex}$ | DK-Ratio | $H_2O$ % in saline |
|---|---|---|---|---|---|---|---|---|
| 75 | 60; | 38.4 | 57.6 | 4 | 1 | 1.06 | 3.3 | 55 |
| 76 | 60; | 33.6 | 62.4 | 4 | 1 | 1.01 | 3.3 | 50 |
| 77 | 60; | 30 | 70 | — | 5 | 1.06 | — | 51 |
| 78 | 60; | 29.9 | 69.2 | 0.5 | 5 | 1.05 | — | 49 |
| 79 | 60; | 29.7 | 69.3 | 1 | 4 | 1.04 | — | 49 |
| 80 | 60; | 29.4 | 68.6 | 2 | 4 | 1.01 | 3.4 | 46 |
| 81 | 60; | 29.1 | 68.6 | 3 | 2 | 1.00 | 3.6 | 44 |
| 82 | 60; | 24.5 | 73.5 | 2 | 3 | 0.96 | 3.8 | 46 |
| 83 | 61; | 20 | 80 | — | 5 | 1.01 | — | 42 |
| 84 | 61; | 19.6 | 78.4 | 2 | 2 | 0.90 | 3.2 | 24 |
| 85 | 61; | 19.5 | 77.5 | 3 | 1 | 0.92 | 3.4 | 27 |
| 86 | 61; | 30 | 70 | — | 3 | 1.01 | — | 47 |
| 87 | 61; | 29.4 | 68.6 | 2 | 1 | 1.00 | 3.85 | 42 |
| 88 | 61; | 29 | 68 | 3 | 1 | 0.97 | 2.56 | 38 |

The results show, that without additional crosslinking agent no high quality lenses can be obtained.

| Example Nr. | EDMA, % | Physical properties: INSTRON test results T. Str. kg/cm$^2$ | Y. Mod. kg/cm$^2$ | Elong. % |
|---|---|---|---|---|
| 65 | 1.0 | 4.6 | 3.8 | 350 |
| 66 | 2.0 | 4.9 | 4.8 | 250 |
| 67 | 3.0 | 7.3 | 6.6 | 200 |
| 68 | 5.0 | 11.7 | 13.8 | 150 |
| 69 | 2.0 | 7.0 | 3.7 | 280 |

What is claimed is:

1. A copolymer which is oxygen permeable, flexible, wettable, biocompatible and suitable for use in ophthalmic devices, such as contact lenses, which copolymer comprises the polymerization product of (A) 15 to 69.9% by weight of a vinyl-telechelic polyether substantially free of fluorine, or a mixture thereof, (B) 30 to 84.9% by weight of (B-1) a fluorinated, ethylenically unsaturated monomer, or (B-2) a silicone-containing ethylenically unsaturated monomer, or a mixture of monomer (B-1) and monomer (B-2), (C) 0 to 40% by weight of an ethylenically unsaturated monomer or mixture of monomers other than monomer (B-1) or monomer (B-2), and (D) 0.1 to 10% by weight of a polyethylenically unsaturated comonomer of 200 to 1000 molecular weight.

2. A copolymer according to claim 1 wherein the vinyl-telechelic polyether is of formula (A)

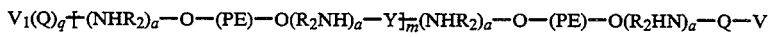

wherein PE has a number average molecular weight (MW$_n$) of about 500 to about 15,000 and has the formula:

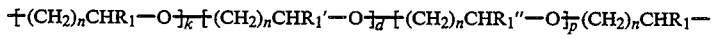

wherein n is 1 to 3, k, d, p are integers from 0 to 300, and the sum of k+d+p is 7 to 300, R$_1$, R$_1'$, R$_1''$ are independently of each other H or CH$_3$, with the proviso that when n = 3, R$_1$, R$_1'$, R$_1''$ are hydrogen, a is zero or 1, m is an integer from zero to 2, q is zero or 1, R$_2$ is an linear or branched alkylene with 2 to 4 carbon atoms, Y is —CONH—R$_3$—NHOC— or —CO—, wherein R$_3$ is a divalent aliphatic group of 2 to 14 carbon atoms, a divalent 5- or 6-membered cycloaliphatic group with 5 to 15 carbon atoms or an arylene group of 6 to 14 carbon atoms, with the proviso that when Y is —CO—, a is 1, Q, shown as it is attached to V, is selected from the group consisting of

Q$_1$V = —CO—V,

Q$_2$V = —CONH—R$_3$—NHOC—X—R$_4$—X$_1$—(-CO)$_b$—V,

Q$_3$V = —CONH—R$_5$OOC—V, and

Q$_4$C = —CONH—R$_6$—V wherein

R$_4$ is an alkylene of 2 to 4 carbon atoms,

R$_5$ is an alkylene of 2 to 10 carbon atoms,

R$_6$ is an arylene or alkyl-substituted arylene of 6 to 20 carbon atoms,

X is —O— or —NR$_7$—,

R$_7$ is an alkyl of 1 to 5 carbon atoms

X$_1$ is —O—, —NH— or —NR$_7$—, b is zero or 1,

V is —(CH$_2$)$_c$CR$_1$=CR$_8$H c is zero or 1,

V$_1$ has same meaning as V, or V$_1$ is H or R$_9$, when q is zero,

R$_8$ is H or —COOH, with the proviso that, if R$_8$ is COOH,

R$_1$ is H, c is zero, and Q is Q$_1$;

R$_9$ is an alkyl of 1 to 18 carbon atoms;

with the further proviso that when Q is Q$_2$, a is zero;

when Q is Q$_2$, Q$_3$ or Q$_4$, R$_8$ is H;

when c is 1, b is zero, Q is Q$_2$ and R$_1$ and R$_8$ are H; and when V$_1$ is R$_9$, m is zero.

3. A copolymer according to claim 2 wherein the polyether PE is a poly(ethylene oxide) of 500–12000 MW, a poly(propylene oxide) of 500–15000 MW a poly-(ethylene oxide (A)-co-propylene oxide (B)) of random or block copolymer structure in ratios of A:B from 1:30 to 30:1 of 500–15000 MW, or a poly(tetramethylene oxide) of 500–10000 MW wherein A is the amount of poly(ethylene oxide) and (B) is the amount of propylene oxide.

4. A copolymer according to claim 3 wherein the polyether PE is a poly(ethylene oxide) of 1500–10000 MW, or a poly(ethylene oxide-co-propylene oxide) of 1500–10000 MW and wherein a is 1 and R$_2$ is —CH$_2$—CHCH$_3$—.

5. A copolymer according to claim 3 wherein the polyether (PE) is an poly(propylene oxide) of 1000–8000 MW, a is 1 and R$_2$ is —CH$_2$—CHCH$_3$—.

6. A copolymer according to claim 3 wherein QV is Q$_2$V, wherein R$_3$ is a divalent radical obtained by removing the two —NCO groups from a diisocyanate selected from the group consisting of ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatobenzene, bis(4-isocyanatocyclohexyl)methane, bis-(4-isocyanatocyclohexenyl)-methane, bis(4-isocyanatophenyl)-methane, 2,6- and 2,4-toluene diisocyanate; 3,3-dichloro-4,4'-diisocyanatobiphenyl; tris(4-isocyanatophenyl)methane, 1,5-diisocyanatonaphthalene, hydrogenated toluene diisocyanate; 1-isocyanatomethyl-5-isocyanato-1,3-3-trimethylcyclohexane 1,3,5-tris (6-isocyanatohexyl)biuret, 1,6-diisocyanato-2,2-4-(2,4,4)-trimethylhexane (2,2,4-(2,4,4)-trimethylhexane-1-6-diisocyanate), 2,2'-diisocyanatodiethyl fumarate; 1,5-diisocyanato-1-carboxypentane; 1,2-, 1,3-, 1,6-, 1,7-, 1,8-, 2,7- and 2,3-diisocyanato naphthalene; 2,4- and 2,7-diisocyanato-1-methylnaphthalene; 4,4'-diisocyanato-biphenyl; 4,4'-diisocyanato-3,3'-diisocyanato-6(7)-methyl-naphthalene; 4,4'-diisocyanato-2,2'-dimethyl biphenyl; bis-(4-isocyanatophenyl) ethane and, bis(4-isocyanatophenyl ether; and wherein V—(CO)$_b$—X$_1$—R$_4$— is the radical obtained by removing the active hydrogen atom from a hydroxyl or amino group of a compound selected from the group consisting of 2-hydroxyethyl acrylate and methacrylate; 2- and 3-hydroxy-propyl acrylate and methacrylate; 4-hydroxybutyl acrylate and methacrylate; glycerol dimethacrylate; hydroxyethyl maleate and fumarate; 2-hydroxyethyl- and 4-hydroxy-butyl vinyl ether; N-tert. -butylaminoethyl methacrylate,N-(3-hydroxypropyl)-methacrylamide; vinyl-benzyl alcohol; and allyl alcohol.

7. A copolymer according to claim 6 wherein the diisocyanate is 1-isocyanatomethyl-5-isocyanato-1,3-3-trimethylcyclohexane 2,2,4-(2,4,4)-trimethylhexane-1,6-diisocyanate, 2,4-toluene diisocyanate or 2,6-toluene diisocyanate, and the active hydrogen containing vinyl compound is 2-hydroxyethyl methacrylate, 2-hydroxyethyl acrylate or N-tert. butyl-amino ethyl methacrylate.

8. A copolymer according to claim 3 wherein QV is Q$_3$V and V—COO—R$_5$— is the radical obtained by removing the —NCO, group from an isocyanate compound selected from the group consisting of 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

9. A copolymer according to claim 8 wherein the isocyanate compound is 2-isocyanatoethyl methacrylate.

10. A copolymer according to claim 3 wherein QV is Q$_4$V and V—R$_6$— is the radical obtained by removing the —NCO group from 2-isocyanatobutyl vinyl ether, styrene isocyanate, or m-isopropenyl-α,α-dimethylbenzyl isocyanate.

11. A copolymer according to claim 10 wherein the isocyanate is m-isopropenyl-α,α-dimethylbenzyl isocyanate.

12. A copolymer according to claim 4 wherein QV is Q$_3$V and V—COO—R$_5$— is the radical obtained by removing the —NCO group from an isocyanate compound selected from the group consisting of 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

13. A copolymer according to claim 4 wherein QV is Q$_4$V and V—R$_6$— is the radical obtained by removing the —NCO group from 2-isocyanatobutyl vinyl ether, styrene isocyanate, or m-isopropenyl-α,α-dimethylbenzyl isocyanate.

14. A copolymer according to claim 5 wherein QV is Q$_3$V and V—COO—R$_5$— is the radical obtained by removing the —NCO group from an isocyanate compound selected from the group consisting of 2-isocyanatoethyl methacrylate, 2-isocyanatoethyl acrylate, 3-isocyanatopropyl methacrylate, 1-methyl-2-isocyanatoethyl methacrylate, and 1,1-dimethyl-2-isocyanatoethyl acrylate.

15. A copolymer according to claim 5 wherein QV is Q$_4$V and V—R$_6$— is the radical obtained by removing the —NCO group from 2-isocyanatobutyl vinyl ether, styrene isocyanate, or m-isopropenyl-α,α-dimethylbenzyl isocyanate.

16. A copolymer according to claim 13, wherein the isocyanate is m-isopropenyl-α,α-dimethylbenzyl isocyanate.

17. A copolymer according to claim 14, wherein the isocyanate is 2-isocyanatoethyl methacrylate.

18. A copolymer according to claim 14, wherein the isocyanate is m-isopropenyl-α,α-dimethyl benzylisocyanate.

19. A copolymer according to claim 2 where in PE is poly(ethylene oxide), poly(propylene oxide) or poly(ethylene oxide-co-propylene oxide) and QV is Q$_2$V, Q$_3$V or Q$_4$V.

20. A copolymer according to claim 20 wherein QV is Q$_3$V or Q$_4$V and a is 1.

21. A copolymer according to claim 1 wherein (B-1) is a fluorine containing monomer containing at least three fluorine atoms consisting of the acrylate or methacrylate esters of the formula

         (I)

wherein
R$_f$ is —(CF$_2$)$_r$CF$_2$L or —(CF$_2$CF$_2$)$_g$OCF(CF$_3$)$_2$
R$_1$ is hydrogen or methyl,
X is oxygen or —NR$_7$— wherein R$_7$ is an alkyl group with 1–5 carbon atoms.
r is an integer from 1–4,
t is an integer from 0–14,
g is an integer from 1–3,
L is hydrogen or fluorine, with the proviso that, when t is O, L is fluorine, and
W is a direct bond or a divalent group of the structure —NR$_7$—CO—; —NR$_7$SO$_2$—(CH$_2$)$_r$—; —NR$_7$SO$_2$—; —S—(CH$_2$)$_r$—; —NR$_7$—(CH$_2$)$_r$—; NR$_7$SO$_2$— or —NHCO—.

22. A copolymer according to claim 1 wherein (B-1) is a fluorinated monomer selected from the group consisting of hexafluoroisopropyl acrylate, hexafluoroisopropyl methacrylate, or of a compound of structure (I), wherein W is a direct bond, X is oxygen, R$_f$ is —(CF$_2$)$_r$CF$_2$L and L is fluorine.

23. A copolymer according to claim 22 wherein in the compound of structure (I), R$_1$ is hydrogen, r is 2 and t is 6 to 10; or in which R$_1$ is hydrogen, r is 1 or 2 and t is 1–4, or in which R$_1$ is methyl, r is 2 and t is 4–10.

24. A copolymer according to claim 22, wherein in the compound of structure (I) r is 1 or 2 and t is 4–8.

25. A copolymer according to claim 22, wherein in the compound of structure (I) R is methyl, r is 2 and t is 4 to 10.

26. A copolymer according to claim 1 wherein (B-2) is a silicone containing vinyl monomer which is an oligosiloxanylsilyl-alkyl acrylate or methacrylate containing 2 to 10 silicon atoms.

27. A copolymer according to claim 26 wherein the monomer is selected from the group consisting of tris(trimethylsiloxysilyl)propyl (meth) acrylate, triphenyldimethyldisiloxanylmethyl (meth)acrylate, pentamethyl-disiloxanylmethyl (meth)acrylate, tert-butyl-tetramethyl-disiloxanylethyl (meth)-acrylate, methyl-di(trimethylsiloxy)silylpropylglyceryl (meth)acrylate; pentamethyldisiloxanyl-methyl methacrylate, heptamethyl-cyclotetrasiloxy methyl methacrylate; heptamethyl-cyclotetra-siloxy-propyl methacrylate; (trimethylsilyl)-decamethyl-pentasiloxy-propyl methacrylate; and dodecamethyl pentasiloxypropyl methacrylate.

28. A copolymer according to claim 27 wherein the monomer is tris(trimethylsiloxy-silyl) propyl methacrylate.

29. A copolymer according to claim 1 wherein component (B) is 50 to 84.5% by weight of said copolymer, component (C) is 0 to 20% by weight and component (D) is 0.5 to 7% by weight.

30. A copolymer according to claim 2, wherein component (A) is 15 to 50% by weight and the polyether PE is a poly(ethylene oxide) of 1500–10000 MW, or a poly(ethylene oxide-co-propylene oxide) of 1500–10000 MW and wherein a is 1 and R$_2$ is —CH$_2$—CHCH$_3$—, wherein QV is Q$_3$V or Q$_4$V, and V—COO—R$_5$— is the radical obtained by removing the —NCO group from 2-isocyanatoethyl methacrylate or 2-isocyanatoethyl acrylate, and wherein V—R$_6$— is the radical obtained by removing the —NCO group from styrene isocyanate or m-isopropenyl-α,α-dimethylbenzyl isocyanate;
component (B) is 50 to 84.5% by weight of component (B-1), wherein (B-1) is a fluorinated monomer selected from the group consisting of hexafluoroisopropyl acrylate, hexafluoroisopropyl methacrylate, or is a fluorine containing monomer containing at least three fluorine atoms and having the formula $$CH_2=CR_1-COX(CH_2)_r-W-R_f$$

wherein
W is a direct bond, X is oxygen and $R_f$ is $-(CF_2)_tCF_2L$
$R_1$ is hydrogen or methyl,
r is an integer from 1–4,
t is an integer from 0–10,
L is hydrogen or fluorine, with the proviso that, when t is O, L is fluorine, and
component (C) is 0 to 20% by weight and component (D) is 0.5 to 7% by weight.

31. A copolymer according to claim 29 wherein component (D) is 0.5 to 7% by weight of the diacrylates and dimethacrylates of 1,2-ethylene glycol, 1,2- and 1,3-propanediol and of 1,3- and 1,4-butane-, 1,5-pentane- and 1,6-hexanediol; the diacrylates and dimethacrylates of diethylene, triethylene- and tetraethylene glycol, and of neopentyl glycol, di-(2-hydroxyethyl) sulfone and thiodiethylene glycol; trimethylolpropane triacrylate and trimethacrylate, ditrimethylolpropane tetraacrylate, pentaerythritol tetraacrylate and tetramethacrylate, di-pentaerythritol monohydroxy pentaacrylate; bisphenol-A- and ethoxylated bisphenol-A-dimethacrylate, tris(2-hydroxyethyl)-isocyanurate triacrylate; allyl methacrylate; methylene-bisacrylamide, ethylene-bismethacrylamide, divinylbenzene, allyl methacrylate and butanediol divinylether and the reaction products of equivalent amounts of aliphatic, cycloaliphatic and aromatic diisocyanates or of vinyl-unsaturated isocyanates with hydroxy or amino substituted acrylates and methacrylates.

32. A copolymer according to claim 1 wherein component (C) is is methoxy-ethyl acrylate and methoxy-ethyl methacrylate, ethoxy-ethyl acrylate and ethoxy-ethyl methacrylate; ethoxy-ethoxy-ethyl acrylate, methyl methacrylate; methyl acrylate, 2-hydroxyethyl methacrylate; N-vinylpyrrolidone; N,N-dimethylacrylamide, styrene, or mixtures thereof and component-(D) is ethyleneglycol diacrylate or dimethacrylate, trimethylolpropane triacrylate or methacrylate, neopentyl glycol diacrylate or methacrylate, allyl methacrylate or divinyl benzene.

33. A copolymer according to claim 1 wherein component (D) is 0.5 to 7% by weight of said copolymer.

34. A copolymer according to claim 1 wherein component (D) is 0.1 to 0.5% by weight of said copolymer.

35. A copolymer according to claim 1 which is a contact lens.
36. A copolymer according to claim 2 which is a contact lens.
37. A copolymer according to claim 4 which is a contact lens.
38. A copolymer according to claim 5 which is a contact lens.
39. A copolymer according to claim 7 which is a contact lens.
40. A copolymer according to claim 8 which is a contact lens.
41. A copolymer according to claim 9 which is a contact lens.
42. A copolymer according to claim 10 which is a contact lens.
43. A copolymer according to claim 11 which is a contact lens.
44. A copolymer according to claim 12 which is a contact lens.
45. A copolymer according to claim 13 which is a contact lens.
46. A copolymer according to claim 16 which is a contact lens.
47. A copolymer according to claim 17 which is a contact lens.
48. A copolymer according to claim 18 which is a contact lens.
49. A copolymer according to claim 19 which is a contact lens.
50. A copolymer according to claim 21 which is a contact lens.
51. A copolymer according to claim 22 which is a contact lens.
52. A copolymer according to claim 23 which is a contact lens.
53. A copolymer according to claim 24 which is a contact lens.
54. A copolymer according to claim 25 which is a contact lens.
55. A copolymer according to claim 26 which is a contact lens.
56. A copolymer according to claim 29 which is a contact lens.
57. A copolymer according to claim 32 which is a contact lens.
58. A copolymer according to claim 34 which is a contact lens.

* * * * *